June 18, 1968  R. A. FULLER  3,388,899
HEATING SECTION OF DECORATING LEHR
Filed March 30, 1966  3 Sheets-Sheet 1
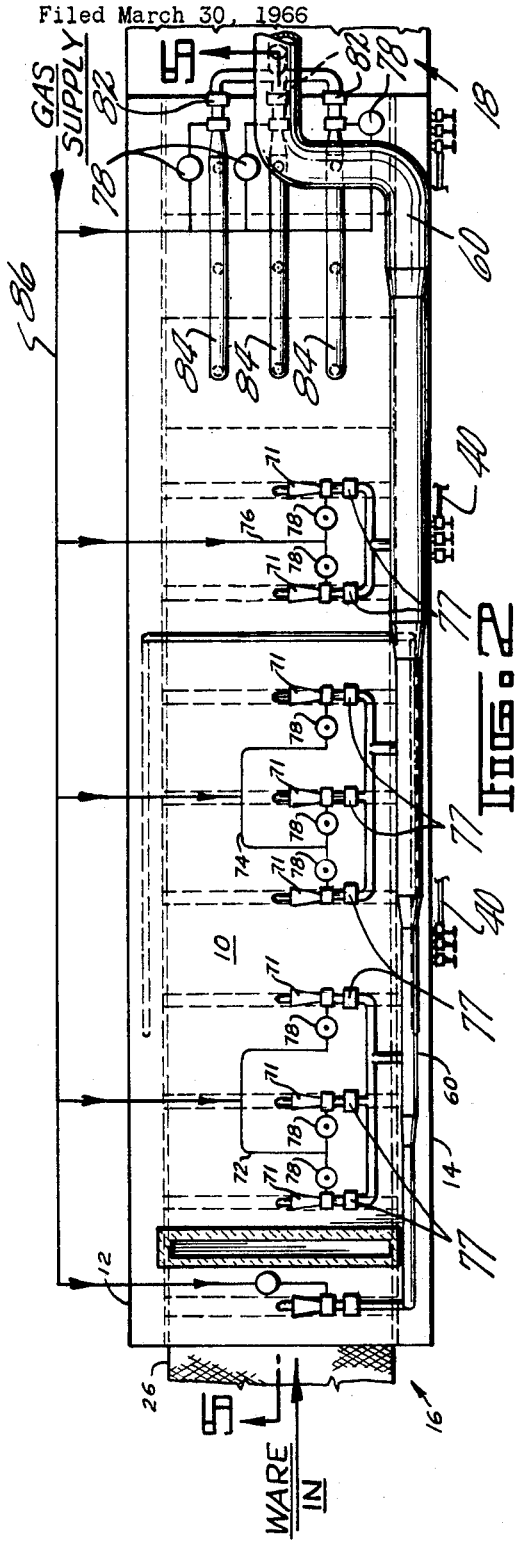
INVENTOR.
ROBERT A. FULLER
BY
McCormick, Paulding & Huber
ATTORNEYS.

June 18, 1968  R. A. FULLER  3,388,899
HEATING SECTION OF DECORATING LEHR
Filed March 30, 1966  3 Sheets-Sheet 2
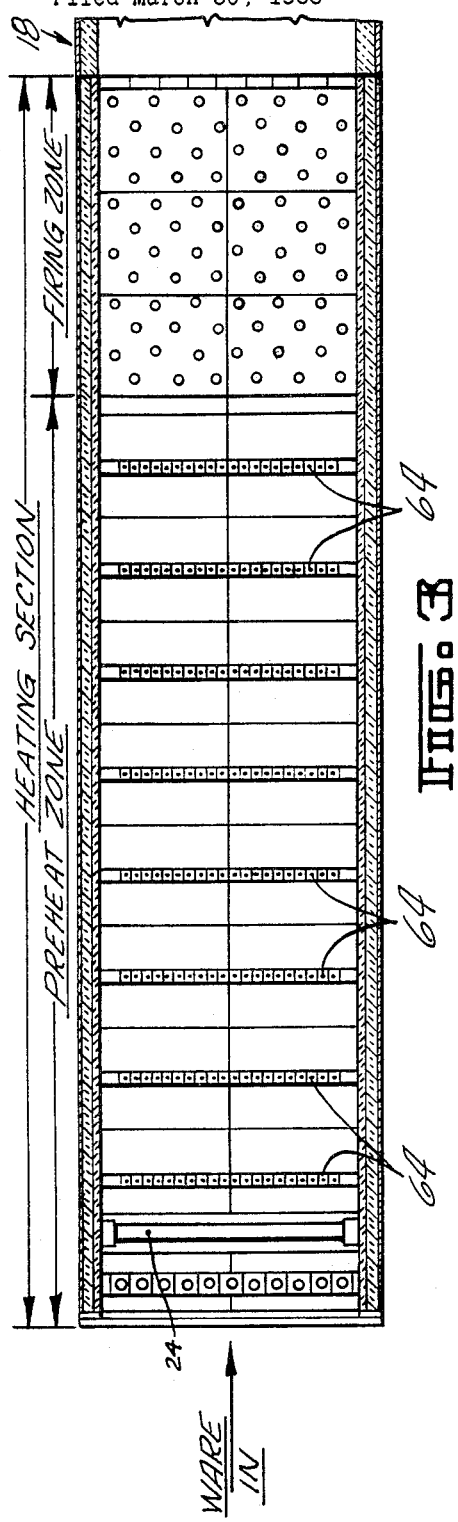
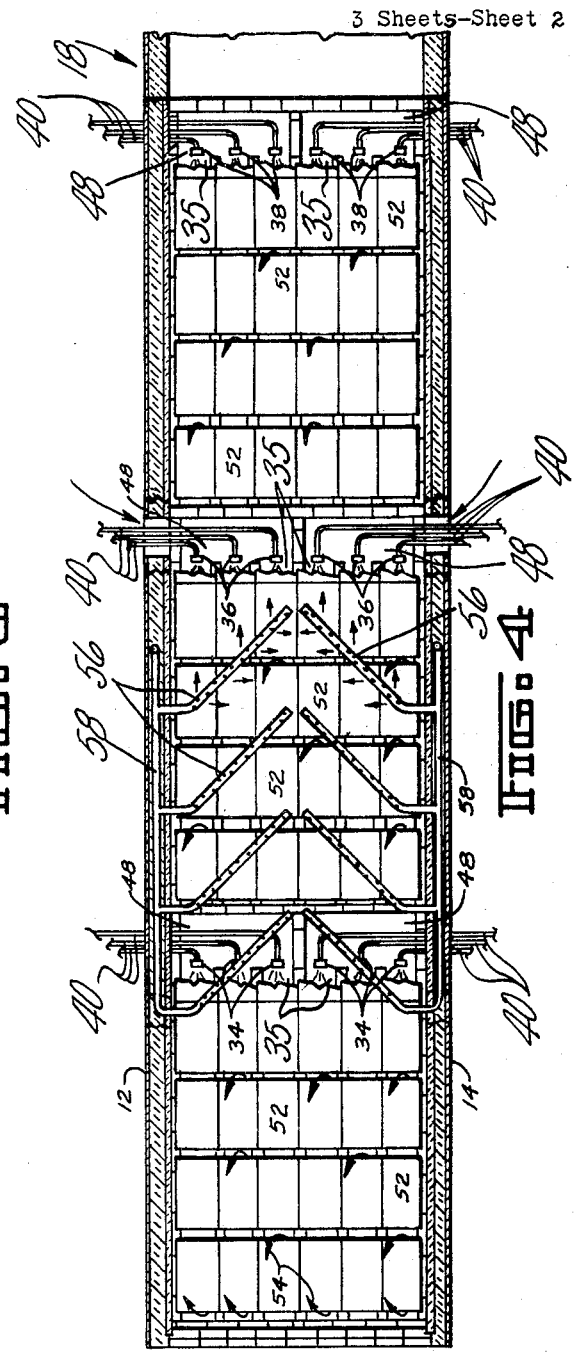
INVENTOR.
ROBERT A. FULLER
BY
ATTORNEYS.

June 18, 1968  R. A. FULLER  3,388,899
HEATING SECTION OF DECORATING LEHR
Filed March 30, 1966  3 Sheets-Sheet 3
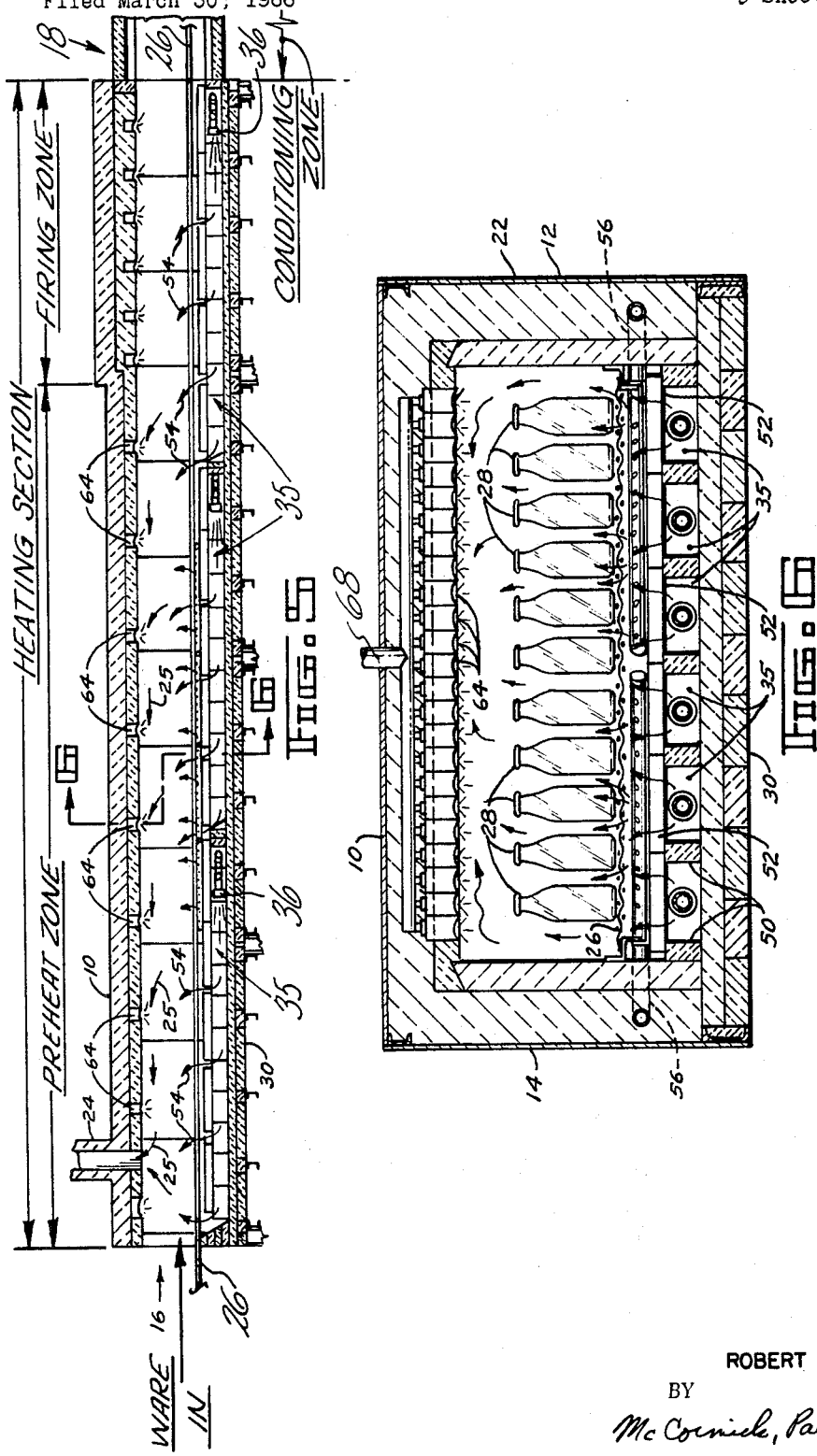
INVENTOR.
ROBERT A. FULLER
BY
McCormick, Paulding & Huber
ATTORNEYS.

3,388,899
HEATING SECTION OF DECORATING LEHR
Robert A. Fuller, West Hartford, Conn., assignor to Emhart Corporation, Bloomfield, Conn., a corporation of Connecticut
Filed Mar. 30, 1966, Ser. No. 538,625
9 Claims. (Cl. 263—8)

ABSTRACT OF THE DISCLOSURE

A decorating lehr in which the pre-heat and firing zones include a floor structure above which the ware is adapted to be conveyed on a mesh type conveyor. A plurality of longitudinally extending flues extend at least part way along the floor structure, and each flue has a burner nozzle so mounted therein as to discharge exhaust gases in an upstream direction. Thin heat radiating tiles form the upper boundary of each flue and some of these are spaced from one another to provide slots through which flue exhaust gases are dispersed upwardly through the mesh conveyor. A plurality of tubes extend transversely inwardly above the heat radiating tiles, and each tube has a plurality of nozzle openings through which air is directed upwardly and through the conveyor to create an excess of oxygen in the lehr. Burners in the roof structure of the lehr burn off the volatilized resins driven from the ware by these gases thus preventing the resins from condensing inside the lehr.

---

This invention relates generally to glassware lehrs and deals more particularly with a so-called glassware decorating lehr. A decorating lehr normally comprises preheat, firing, conditioning, annealing and cooling zones, and the general object of the present invention is to provide improved preheating and firing zones for such a lehr. The preheat and firing zones will be collectively referred to herein as the heating section of the decorating lehr. The annealing and cooling zones of the decorating lehr may be similar to those described in my prior copending patent application, Ser. No. 261,643, filed Feb. 28, 1963, now U.S. Patent No. 3,259,481.

Decorating lehrs are similar to annealing lehrs generally in that both types of lehrs subject the ware to relatively high temperatures in a tunnel-shaped oven having a conveyor extending therethrough. The design problems associated with decorating lehrs are unique in some respects due to the requirement of fusing a ceramic type decorative coating onto portions of the ware. This requirement is an added one in that the ware must also be annealed and cooled in the decorating lehr just as in the annealing lehr. Since the present improvement has to do with the above defined heating section of a decorating lehr where this fusion takes place, and since the annealing and cooling zones of my prior application adequately disclose the remaining portion of a decorating lehr, only the heating section will be described in detail herein. However, it should be noted that a complete decorating lehr would include all of the various zones set forth above.

One major problem with prior art decorating lehrs is their propensity to accumulate, in condensed form, the resins used as a vehicle in applying the ceramic type decorative coating to the ware in a prior decorating process. These resins are vaporized as a result of heating the ware to fuse the ceramic coating, but are prone to subsequent condensation inside the tunnel and in some cases the accumulated resins run off the lehr structure onto the surrounding floor. It will of course be apparent that these resins can present a severe disposal problem, proportional in magnitude to the quantity of ware being handled by the lehr per unit time. Since the capacity of all glassware handling apparatus has undergone a substantial increase in recent years, there is a definite need for an improved decorating lehr capable of handling increased quantities of ware, and also capable of disposing of the increased quantities of resins used in the decorating process.

Accordingly, an object of the present invention is to provide a decorating lehr having an improved heating section capable of disposing of relatively large quantities of the resins used in a prior decorating printing or coating process.

A more specific object of the present invention is to provide a decorating lehr having an improved heating section with a firing zone where the resins and other volatile carbonaceous materials in the decorative coating are more effectively burned out.

Another specific object of the present invention is to provide a decorating lehr having an improved heating section with a firing zone which avoids the heretofore encountered problems of incomplete resin burn-out, such as discoloration and blistering of the decorative coating.

Another specific object of the present invention is to provide a decorating lehr having an improved heating section which avoids the heretofore encountered problems of prior art decorating lehrs wherein the vaporized resins were allowed to accumulate in condensed form in the tunnel itself or in ventilating flues, and in some cases to run off onto the subadjacent floor causing a severe fire, health, and safety hazard.

Another specific object of the present invention is to provide a decorating lehr having an improved heating section which avoids the heretofore encountered problems of prior art lehrs wherein combustible or inflammable fumes were allowed to form in the tunnel and its associated stack causing an explosive hazard within the lehr structure, and a health hazard outside the lehr due to the toxicity of these fumes.

A still further object of the present invention is to provide a decorating lehr which occupies a minimum of plant floor space as a result of an improved lehr heating section capable of accommodating increased quantities of decorated ware.

The drawings show a preferred embodiment of the invention and such embodiment will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a side elevational view of an improved heating section of a decorating lehr, the conditioning zone of the lehr being shown broken away at the right-hand end of the heating section;

FIG. 2 is a plan view of the lehr heating section shown in FIG. 1, the conditioning zone again being shown broken away;

FIG. 3 is a horizontal sectional view taken along the line 3—3 of FIG. 1 and shows in detail the roof portion of the lehr heating section;

FIG. 4 is a horizontal sectional view taken along the line 4—4 of FIG. 1 and shows in detail the floor structure of the lehr heating section with portions thereof being broken away to reveal in part longitudinally extending flue passageways and their associated burners;

FIG. 5 is a vertical sectional view taken along the line 5—5 of FIG. 2;

FIG. 6 is a vertical cross-sectional view taken along the line 6—6 of FIG. 5.

A decorating lehr embodying the present invention is shown in pertinent part in FIGS. 1 and 2 as comprising a heating section which is integrally connected to annealing and cooling zones by a conditioning zone 18.

As mentioned hereinabove, the annealing and cooling zones may be similar to those described in my prior copending application and hence need not be shown or described in detail herein. The conditioning zone 18 serves the same purpose as the corresponding zone described in this prior application, namely to bring the ware to a proper temperature (usually the annealing point) prior to these annealing and cooling zones.

Turning now to the construction of the lehr heating section in greater detail, FIGS. 1 and 2 show a preferred embodiment wherein the heating section comprises a preheat and a firing zone, the latter zone being integrally connected to the conditioning zone 18 of the lehr as indicated by the broken away right-hand portion of the zone 18.

The heating section shown comprises an elongated tunnel defining structure having a roof 10 and spaced side walls 12 and 14 extending from an upstream, or ware entrance end, 16 of the preheat zone to the conditioning zone 18. The roof and side wall portions of the tunnel are preferably made from a series of refractory blocks surrounded by insulation material such as mineral wool as indicated in FIGS. 3 and 6. Finally, the insulation is held in place by a metal sheath 22 which also improves the lehr's external appearance, and serves to reflect inwardly heat which might otherwise escape from the lehr by radiation.

As best shown in FIG. 1, a stack 24 is provided adjacent the upstream end 16 of the tunnel for carrying off exhaust gases and other products of combustion. Still with reference to FIG. 1, a continuously moving conveyor belt 26 extends through the tunnel in downwardly spaced relation to the roof 10, and is carried on suitable supports of conventional design so that decorated glassware, as indicated generally at 28, 28 in FIG. 6 can be conveyed downstream through the tunnel from the upstream end 16 into the conditioning zone 18 and thence into the lehr annealing and cooling zones (not shown). The conveyor 26 is preferably of open mesh metal construction so that bottom burners, to be described in greater detail hereinbelow, can be fired inside the tunnel, and their associated exhaust gases passed upwardly through the conveyor and thence upstream through the tunnel and out the aforementioned stack 24. The general path of the gases inside the tunnel during operation of the lehr is best illustrated in FIG. 5 by the several arrows 25, 25 shown in that figure.

The floor structure of the tunnel is best shown in FIGS. 4, 5 and 6, and from the latter of these figures the said structure will be seen to comprise a lowermost portion of refractory material indicated generally at 30, flue defining refractory blocks 50, 50 arranged in transversely spaced relation above the lower portion 30, and a plurality of relatively thin heat radiating tiles 52, 52 resting on said blocks 50, 50 and forming the upper boundaries of the aforementioned flues.

In accordance with the present invention, various burners are arranged in both the roof portion of the tunnel structure and the flue defining portion thereof, all of which burners cooperate with air introduced below the conveyor 26 for heating and volatilizing the organic resins and to eliminate carbonaceous residue prior to firing the decorative ceramic coating previously applied to the ware. These burners are so arranged as to achieve a more complete burn-out in the firing zone, as well as to ignite any vaporized resins, and other carbonaceous material in the lehr heating section generally.

Considering first the bottom burners, best shown in FIG. 4, at 34, 36 and 38, each of these burners will be seen to comprise supply lines which extend inwardly through the side wall 12 or 14 of the tunnel structure closest thereto. Each of the burners fires longitudinally into an associated flue passageway 35, 35 in the floor structure of the lehr. A first plurality of burners 34, 34 fires into the upstream section of the lehr, while a second plurality of such burners 36, 36 fires into a center portion of the lehr. From FIGS. 3 and 4 it will be apparent that the upstream and center portions comprise the preheat zone of the lehr. Finally, a third plurality of such burners, 38, 38, fires in an upstream direction into a downstream portion of the lehr referred to herein as the firing zone of the lehr, so called because it is in this latter portion of the heating section that the maximum ware temperature is developed and fusing of the decorative coating is accomplished.

A high pressure gas manifold line indicated generally at 40 provides gas pressure to each of the bottom burners and a needle valve 42 associated with each burner permits the tunnel temperature gradient, both across and along the tunnel to be closely regulated. Combustion air for the bottom burners is drawn into the system through an annular orifice 44 immediately below a pressure gauge 46 associated with each such burner. A high pressure mixer (not shown) is provided for each bottom burner immediately behind each such orifice 44. Preferably, and as best shown in FIG. 4, these bottom burners are arranged in groups of three, and each group of such burners enters the lehr through an associated opening which is preferably somewhat greater in cross-sectional size than that of the burner itself. This construction allows room air to be drawn inwardly around the burner, and thence into a plenum chamber 48 associated with each group of burners. As mentioned hereinabove each burner has a flue passageway associated therewith and from FIG. 4 it will be apparent that each bottom burner fires into one end of its associated flue passageway from the aforementioned plenum chamber 48 with the result that room air is drawn into the flue to aid in cooling the burner nozzle itself as well as introducing excess oxygen into the lehr for a purpose to be discussed in greater detail hereinbelow.

Turning now to the flue construction in greater detail, FIG. 6 shows a plurality of refractory blocks 50, 50 arranged in transversely spaced relation on the lower portion 30 of the floor structure so as to define the aforementioned longitudinally extending flues 35, 35. From FIG. 4 it will be apparent that these flues 35, 35 are also arranged in groups of three with the downstream end of each communicating with the aforementioned plenum chambers 48, 48. This downstream end of each flue will be referred to herein as the burner end since each of the groups of burners 34, 36 and 38 fire in an upstream direction into this end of each of the flues. Still with reference to FIG. 4, each of the flues 35 will be seen to have an upper boundary defined by a series of relatively thin heat radiating tiles 52, 52 at least some of which tiles are longitudinally spaced from one another to provide slots therebetween through which the flue exhaust gases may be dispersed upwardly into the tunnel as indicated by the arrows 54, 54 in FIGS. 4 and 5. Preferably, and as best shown in FIG. 4, these tile defined slots increase in size in proportion to their respective distances from the associated bottom burner 34, 36 or 38.

In further accordance with the present invention, means is also provided for introducing air into the space between the conveyor 26 and those heat radiating tiles which form the upper boundary of the flues in the center portion of the lehr. As best shown in FIG. 6, said means comprises a plurality of tubes extending transversely inwardly from the side walls 12 and 14 of the tunnel structure. Each of the tubes 56, 56 has a plurality of nozzle openings along its upper side through which the air is directed upwardly and through the conveyor to contact intimately the decorative coating on the bottles and effectively carry away the vaporized resins driven off in the center portion of the lehr heating section. All of the tubes 56, 56 are supplied with air from a pair of longitudinally extending manifold lines 58, 58 embedded in the side walls of the tunnel structure as best shown in FIG. 4, and each of said manifold lines 58, 58 is connected to an overhead source of air, indicated generally at 60 in FIG. 1.

The major portion of these manifold lines 58, 58 will be seen from FIGS. 1 and 4 to be embedded in the side walls of the tunnel structure in order to heat the air being delivered to the tubes 56, 56. Each of the manifold lines 58, 58 terminates in a short exposed vertically arranged connector line which has a control valve 62 to permit controlling the quantity of heated air discharged into the center portion of the tunnel structure. One function of this heated air, to be described in greater detail hereinbelow, is to create an atmosphere in this portion of the lehr characterized by an excess of oxygen. The air supply for the overhead pipe 60 is preferably room air with the heat for the air being supplied to the manifold line 58 as mentioned above. The actual source of heat does not form an essential part of the invention and for present purposes, it is sufficient to note that all of the tubes 56, 56 communicate with a source of heated air under pressure. With further reference to the preferred embodiment shown in the drawings, it will be noted that the pipes 56, 56 are provided only in the center portion of the lehr heating section. It is in this portion of the lehr heating section that temperatures are most conducive to complete vaporization of the resins in the decorative coating.

In further accordance with the present invention a plurality of refractory, cup type, radiant burners is arranged in the roof portion 10 of the tunnel structure for firing downwardly toward the ware as best shown in FIG. 6. While these burners 64, 64 are each of conventional design in themselves, it is an important feature of the present invention that those in the preheating zone of the decorating lehr are arranged in transverse rows across the tunnel roof as best shown in FIG. 3. Combustion air is supplied to each of these roof burners from the overhead duct 60 through three individual manifolds indicated generally at 66, 68 and 70 in FIG. 1. As best shown in FIG. 2 fuel for each burner row is delivered to a low pressure mixer 71 associated with each of said rows through a gas manifold indicated generally at 72, 74 and 76 respectively. A fuel control valve is associated with each of the rows of burners and is indicated generally by the reference numeral 77 so that each of the rows can be individually controlled as to the quantity of heat delivered to the interior of the lehr tunnel. A gas regulator 78 is associated with each mixer 71. Once the fuel control valve 77 associated with each of said rows is properly preset, each of the burners is automatically controlled by a burner control circuit which includes thermocouples (not shown) associated with burner control valves 80, 80 located between the air supply duct 60 and each of the aforementioned air manifolds 66, 68, and 70 respectively.

While the roof burners are arranged in rows in the so-called preheat zone of the lehr, the firing zone is characterized by a plurality of equally spaced roof burners as best shown in FIG. 3 for a relatively even distribution of heat in this zone. The equally spaced roof burner heaters in the firing zone are divided up into three longitudinally extending transversely spaced banks for individual temperature control of the sides and central portions of the firing zone. These burner banks are automatically controlled by a burner control circuit including thermocouples (not shown) in the side and central portion of the firing zone.

As in the preheat zone, each thermocouple is operatively connected to a burner control valve 82, 82 located between the supply pipe 60 and one of the manifold lines 84, 84 best shown in FIGS. 1 and 2. As so arranged, the three banks of burners permit the temperature in the firing zone to be closely regulated.

While the operation of the decorating lehr has been mentioned in conjunction with the various functions of the lehr's components, its overall operation will now be described. The decorated ware, with its decorative coating in an uncured condition is fed along the conveyor 26 through the abovedescribed heating section of the present invention, and thence through a conditioning zone 18 for bringing the ware to a proper temperature prior to entering annealing and cooling zones of the type disclosed in the abovementioned patent application.

The ware is heated in the heating section from above by roof burners 64, 64 and from below by bottom burners 34, 36 and 38 in order to bake out the resins or oils used as a vehicle in the decorative coating. While the ware does not reach a maximum temperature until it enters the firing zone, the temperature in the preheat zone is sufficient to vaporize or volatilize the organic resins and oils in the center portion of the lehr so as to leave the inorganic coating ready for final fusing.

In order to prevent these resins from condensing on the tunnel structure, especially on the side walls, 12 and 14, on the roof 10, and in the stack 24, the decorating lehr shown employs downwardly firing roof burners, which generate the major portion of the heat, and supplements this with bottom burners which fire, through flues, indirectly onto the bottom of the glassware. The roof burners are arranged in rows in this preheat zone to assure that no volatilized resin vapors escape being burned thereby. Burning of the vapors can occur only if the vapors are caused to rise off the ware and are heated to an adequate temperature in the presence of sufficient oxygen to support combustion. The roof burners provide the proper temperature and heated air is directed upwardly into the center portion of the lehr for volatilizing the resins and causing said resins to rise toward the roof burners 64, 64. This heated air also adds the necessary oxygen to permit burning of the volatilized organic resins.

Still with reference to the lehr heating section, the glassware is heated in the firing zone by bottom burners 38, 38 and roof burners 64, 64 to a temperature high enough to fuse the inorganic decorative coating onto the glass.

Finally, the ware passes through the conditioning zone 18, which serves to bring the ware to a proper temperature prior to the annealing and cooling zones of the lehr (not shown). The annealing and cooling zones may be similar to those shown and described in the abovementioned patent application.

The invention claimed is:

1. A decorating lehr heating section comprising a tunnel defining structure which includes a roof and side walls, an open mesh conveyor extending through said tunnel in downwardly spaced relation to said roof for conveying decorative ware downstream through the tunnel, a floor structure for said tunnel which includes a plurality of longitudinally extending flues extending at least part way along said tunnel in downwardly spaced relation to said conveyor, each of said flues having a burner nozzle mounted at one of its ends for firing longitudinally into said flue, a series of relatively thin heat radiating tiles forming the upper boundary of each flue, at least some of said tiles being longitudinally spaced from one another to provide slots therebetween through which the flue exhaust gases are dispersed upwardly into said tunnel, a plurality of tubes extending transversely inwardly from the side walls of said tunnel, each of said tubes having a plurality of nozzle openings through which the air is directed upwardly and through said conveyor to contact intimately the decorative coating on the ware, all of said tubes communicating with a source of air under pressure, and a plurality of burners in the roof of said tunnel for burning the volatilized resins driven off the ware to prevent said resins from condensing inside said tunnel defining structure.

2. A decorating lehr heating section as set forth in claim 1 wherein said tunnel structure is further characterized by an exhaust stack adjacent its upstream entrance end, and wherein said bottom burner nozzle discharge said gases in an upstream direction in said flues toward said tunnel entrance end, at least some of said roof burners being arranged in transverse rows across said tunnel roof to assure that substantially all of said volatilized resins are burned in order to prevent condensing of said resins inside said stack.

3. A decorating lehr heating section as set forth in claim 1 wherein said tunnel structure is further defined by openings in its side walls through which said burner associated ends of said flues can draw atmospheric air when said burners are operating.

4. A decorating lehr heating section as set forth in claim 2 wherein each of said transverse roof burner rows is individually adjustable for controlling the temperature in the tunnel to assure that all of said volatilized resins are burned.

5. A decorating lehr heating section as set forth in claim 1 wherein each of said bottom burner nozzles is individually adjustable from outside the tunnel to permit the temperature gradient across the tunnel to be closely controlled.

6. A decorating lehr heating section as set forth in claim 5 wherein said longitudinally extending flues are arranged in sets each of which sets extend part way only along said heating section, each of said flues in all of said sets having an individually adjustable burner nozzle associated therewith and a series of heat radiating tiles forming its upper boundary whereby the temperature gradient along the tunnel can also be varied from outside the tunnel.

7. A decorating lehr heating section comprising a tunnel defining structure which includes a roof and side walls, an open mesh conveyor extending through said tunnel in downwardly spaced relation to said roof for conveying decorative ware downstream through the tunnel, a floor structure for said tunnel which includes a plurality of longitudinally extending flues arranged in sets each of which sets extend part-way only along said heating section, each of said flues in all of said sets having an individually adjustable burner nozzle associated therewith, said tiles in each of said sets of flues being longitudinally into said flues, a series of relatively thin heat radiating tiles forming the upper boundary of each flue, each of said tiles in each of said sets of flues hang longitudinally spaced from its adjacent tile in a particular flue to provide a plurality of flue slots through which the flue exhaust gases are dispersed upwardly into said tunnel, and wherein one of said sets of flues being arranged in a center portion of said heating section, means for introducing air into the space between said tiles in the flues of said centrally arranged set and said conveyor, and a plurality of burners in the roof of said tunnel for burning the resins driven off the ware to prevent said resins from condensing inside said tunnel defining structure.

8. A decorating lehr heating section as set forth in claim 7 wherein said sets of flues are arranged upstream and downstream of said centrally arranged set of flues to provide flues and associated burners along the entire length of said heating section to provide a further degree of control of the longitudinal temperature gradient in said tunnel.

9. A decorating lehr heating section as set forth in claim 8 wherein all of said heat radiating tiles are longitudinally adjustable to vary the width of said slots defined therebetween, permitting a still further degree of control over the longitudinal temperature gradient in said tunnel.

References Cited
UNITED STATES PATENTS

| | | | |
|---|---|---|---|
| 2,840,361 | 6/1958 | Hermans | 263—8 |
| 3,010,710 | 11/1961 | Bowman | 263—8 |
| 3,261,596 | 7/1966 | Bomwan | 263—8 |

FREDERICK L. MATTESON, JR., *Primary Examiner.*

JOHN J. CAMBY, *Assistant Examiner.*

UNITED STATES PATENT OFFICE
CERTIFICATE OF CORRECTION

Patent No. 3,388,899                          June 18, 1968

Robert A. Fuller

It is certified that error appears in the above identified patent and that said Letters Patent are hereby corrected as shown below:

Column 8, line 1, "said tiles in each of said sets of flues being" should read -- said burner nozzles being adapted to fire --; line 4, "hang" should read -- being --.

Signed and sealed this 4th day of November 1969.

(SEAL)
Attest:

Edward M. Fletcher, Jr.                      WILLIAM E. SCHUYLER, JR.
Attesting Officer                               Commissioner of Patents